US012330626B2

United States Patent
Dolinsky et al.

(10) Patent No.: US 12,330,626 B2
(45) Date of Patent: Jun. 17, 2025

(54) HIERARCHICAL OPTIMAL CONTROLLER FOR PREDICTIVE POWER SPLIT

(71) Applicant: Garrett Transportation I Inc., Torrance, CA (US)

(72) Inventors: Kamil Dolinsky, Prague (CZ); Matej Pcolka, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 241 days.

(21) Appl. No.: 17/969,359

(22) Filed: Oct. 19, 2022

(65) Prior Publication Data
US 2024/0132048 A1 Apr. 25, 2024
US 2024/0227775 A9 Jul. 11, 2024

(51) Int. Cl.
| | |
|---|---|
| *B60W 20/12* | (2016.01) |
| *B60W 10/06* | (2006.01) |
| *B60W 10/08* | (2006.01) |
| *B60W 10/10* | (2012.01) |
| *B60W 20/13* | (2016.01) |
| *B60W 20/15* | (2016.01) |
| *B60W 20/30* | (2016.01) |

(Continued)

(52) U.S. Cl.
CPC .......... *B60W 20/15* (2016.01); *B60W 10/06* (2013.01); *B60W 10/08* (2013.01); *B60W 10/10* (2013.01); *B60W 20/30* (2013.01); *B60W 2510/0657* (2013.01); *B60W 2510/083* (2013.01); *B60W 2710/0666* (2013.01); *B60W 2710/083* (2013.01); *B60W 2710/1005* (2013.01)

(58) Field of Classification Search
CPC .... B60W 20/13; B60W 40/072; B60W 10/06; B60W 50/14; B60W 20/10; B60W 10/00; B60W 20/12; B60W 10/08; B60W 50/0097; B60W 20/11; B60L 15/2045; B60L 50/16; B60L 58/12; B60L 15/16; B60K 6/32; B60K 6/22; G01C 21/3469
See application file for complete search history.

(56) References Cited

U.S. PATENT DOCUMENTS

| | | |
|---|---|---|
| 7,482,769 B2 | 1/2009 | Kutsuna et al. |
| 8,095,254 B2 | 1/2012 | Heap et al. |

(Continued)

FOREIGN PATENT DOCUMENTS

| | | | | |
|---|---|---|---|---|
| CN | 103770779 A | * | 5/2014 | ............ B60W 10/06 |
| DE | 102020208886 A1 | * | 1/2022 | .......... B60L 15/2045 |

(Continued)

OTHER PUBLICATIONS

Extended European Search Report for EP 23196307.5 dated Feb. 2, 2023, 11 pages.

(Continued)

*Primary Examiner* — Yuri Kan, P.E.
(74) *Attorney, Agent, or Firm* — Seager, Tufte & Wickhem LLP (57) ABSTRACT

Methods and systems for hybrid vehicle control. A high-level controller and a low-level controller are provided. The high-level controller uses preview information and a model of the low-level controller to calculate optimized tuning parameters for the low-level controller. The low-level controller uses driver inputs and current operating states to calculate optimized torque split for the hybrid engine.

20 Claims, 9 Drawing Sheets

(51) Int. Cl.
*B60W 40/06* (2012.01)
*B60W 40/105* (2012.01)

(56) References Cited

U.S. PATENT DOCUMENTS

| | | | |
|---|---|---|---|
| 8,239,127 B2 * | 8/2012 | Kono | G01C 21/3469 |
| | | | 701/123 |
| 8,277,350 B2 | 10/2012 | Ai et al. | |
| 9,539,997 B2 | 1/2017 | Sun et al. | |
| 9,616,879 B2 | 4/2017 | Zhao et al. | |
| 9,802,601 B2 | 10/2017 | Wang et al. | |
| 9,809,214 B2 | 11/2017 | Liang et al. | |
| 10,591,914 B2 | 3/2020 | Palanisamy et al. | |
| 10,611,361 B2 | 4/2020 | Park | |
| 10,630,106 B2 | 4/2020 | Janssen et al. | |
| 10,678,253 B2 | 6/2020 | Zeng et al. | |
| 10,894,482 B2 * | 1/2021 | Follen | B60L 58/12 |
| 10,946,853 B2 | 3/2021 | Aoki et al. | |
| 10,955,842 B2 | 3/2021 | Zeng et al. | |
| 11,136,020 B2 | 10/2021 | Cho et al. | |
| 11,142,202 B2 | 10/2021 | Tsuda | |
| 11,279,364 B2 | 3/2022 | Son | |
| 11,535,230 B2 * | 12/2022 | Higuchi | B60K 6/22 |
| 2009/0101421 A1 | 4/2009 | Oyobe et al. | |
| 2009/0118942 A1 | 5/2009 | Hsieh et al. | |
| 2009/0259363 A1 * | 10/2009 | Li | B60W 50/0097 |
| | | | 180/65.265 |
| 2011/0264317 A1 * | 10/2011 | Druenert | B60W 20/11 |
| | | | 701/22 |
| 2013/0325233 A1 | 12/2013 | Whitney et al. | |
| 2014/0371968 A1 * | 12/2014 | Sakamoto | B60L 50/16 |
| | | | 701/22 |
| 2015/0006001 A1 * | 1/2015 | Kawata | B60L 15/2045 |
| | | | 180/65.265 |
| 2015/0046000 A1 * | 2/2015 | Zhao | B60W 10/08 |
| | | | 903/930 |
| 2015/0197237 A1 * | 7/2015 | Li | B60W 20/12 |
| | | | 180/65.265 |
| 2015/0268053 A1 * | 9/2015 | Yu | B60L 15/2045 |
| | | | 701/22 |
| 2016/0096527 A1 * | 4/2016 | D'Amato | B60W 10/00 |
| | | | 701/102 |
| 2017/0008505 A1 * | 1/2017 | Park | B60W 20/10 |
| 2019/0389451 A1 * | 12/2019 | Huang | B60W 10/08 |
| 2020/0247390 A1 | 8/2020 | Ikemura et al. | |
| 2021/0213933 A1 | 7/2021 | Borrelli et al. | |
| 2023/0150502 A1 * | 5/2023 | Dickson | B60W 50/14 |
| | | | 701/95 |
| 2023/0264678 A1 * | 8/2023 | Ogawa | B60W 10/06 |
| | | | 701/22 |
| 2024/0227773 A9 * | 7/2024 | Herceg | B60W 20/13 |
| 2024/0227775 A9 * | 7/2024 | Dolinsky | B60W 40/072 |

FOREIGN PATENT DOCUMENTS

| | | | | |
|---|---|---|---|---|
| FR | | 3120594 A1 * | 9/2022 | B60W 10/06 |
| KR | 10-2015-0066080 A | | 6/2015 | |

OTHER PUBLICATIONS

Zhao, Mingjie et al., "On Weighing the Conflicting Cost Functions for Optimal Energy Management of Electrified Powertrain", IFAC-Papersonline—16th IFAC Symposium on Control in Transportation Systems CTS 2021 Lille, France, Jun. 8-10, 2021, [Online] vol. 53, No. 2, Jul. 17, 2020 (Jul. 17, 2020), pp. 14129-14134.

* cited by examiner

HIERARCHICAL OPTIMAL CONTROLLER FOR PREDICTIVE POWER SPLIT

BACKGROUND

Various algorithms have been described and designed for controlling power split and/or battery usage in a hybrid vehicle. A hybrid vehicle is any vehicle which includes a first powertrain (a first power source) that consumes fuel from a refillable or replaceable onboard fuel source, and an electric powertrain (a second power source) using a motor driven by electricity stored in rechargeable storage. The first powertrain may use, for example and without limitation, a fuel cell, gasoline, diesel, propane, natural gas, hydrogen, or any other suitable chemistry and/or technology, any of which may be an engine as used herein. Several layouts are known, including those in which the electric motor cannot be mechanically disconnected from the second power train, as well as those which use a clutch to allow disconnection of the second power train. A power split is the determination of how much power is to be obtained from each powertrain at any given time.

U.S. Pat. No. 9,114,806 discloses obtaining predictive data including route related data, calculating a "system efficient engine power" (which appears to be by use of a maximum engine efficiency for given engine speed) and an engine power curve (the power necessary to meet drive demand), and identifies differences between the two curves in a forward-looking approach. The battery is used to bridge the gap between system efficient engine power and the power needed to meet anticipated driver demand.

U.S. Pat. Nos. 9,193,351 and 10,124,678 perform a route analysis and segment the upcoming route. In U.S. Pat. No. 9,193,351, the patent teaches calculating an optimized battery state of charge (SOC) for each segment, and managing torque split to achieve the optimized SOC (as a setpoint) at the end of each segment. U.S. Pat. No. 10,124,678 characterizes each segment of the upcoming route, and optimizes power split control according to segment type. The use of segmentation indicates a plan which will not respond in real time to actual operation of the system, as the overall route is already segmented and planned. Driver, lead vehicle (or other traffic) interaction with the system will make conformity to such pre-planned route segmentation inefficient. For example, actions by the driver inconsistent with a segmented route plan can throw off the battery SOC relative to the segment SOC setpoints; in order to get back to the "plan", suboptimal operation would be needed.

Other algorithms address specific cases. For example, U.S. Pat. No. 10,894,482 offers a specific solution for a predicted upcoming downhill route segment, in which the battery SOC is reduced to a lower limit in anticipation of recharge during the downhill segment. US PG Pat. Pub. 20050228553 identifies distance and route to a destination from prior use and navigation data, and turns off the non-battery power source (an internal combustion engine) in time to allow use of electric power to minimize battery SOC upon arrival.

What is needed is a more complete solution across a predicted route which allows optimization to achieve the best fuel economy over the navigation preview without locking in a rigid solution that cannot react to actual operation.

Overview

The present inventors have recognized, among other things, that a problem to be solved is the need for new and/or alternative configurations and methods for hybrid vehicle control. In some examples a hierarchical control architecture is used with a high-level controller and a low-level controller. In some examples, the high-level controller uses preview information and a model of the low-level controller to calculate optimized tuning parameters for the low-level controller, and communicates the optimized tuning parameters to the low-level controller. Further in some examples, the low-level controller receives the optimized tuning parameters, and uses such optimized tuning parameters, driver inputs and current operating states to calculate optimized torque split for the hybrid engine.

A first, illustrative and non-limiting example takes the form of a control system for a hybrid vehicle, the hybrid vehicle having a first power source in the form of a battery having a state of charge (SOC) and a motor configured to provide a first torque, and a second power source configured to provide a second torque, the control system comprising: a high-level controller having an associated first memory, the first memory storing one or more readable instruction sets for high-level controller tasks; a low-level controller having an associated second memory, the second memory storing one or more readable instruction sets for low-level controller tasks; wherein the high-level controller tasks comprise: receiving preview information related to a travel path for the hybrid vehicle, and one or more current state variables for the vehicle; using a model of the low-level controller, one or more models of system dynamics for the hybrid vehicle, and the one or more current state variables, calculating an optimal fuel consumption over a prediction horizon including a portion of the travel path, and calculating one or more low-level control variables for use by the low-level controller; and communicating the one or more low-level control variables to the low-level controller; wherein the low-level controller tasks comprise: receiving the one or more low-level control variables from the high-level controller and one or more current state variables for the hybrid vehicle; calculating the first torque and the second torque to provide optimal fuel consumption within minimum and maximum limits for each of the first torque and second torque; and issuing control signals to the first and second power sources based on the first torque and the second torque.

Additionally or alternatively, the high-level controller is configured to calculate the one or more control values at a first sampling rate; the low-level controller is configured to calculate the first torque, second torque, and on/off signal at a second sampling rate; and the second sampling rate is a faster sampling rate than the first sampling rate. Additionally or alternatively, the second power source uses a fuel, and the low-level controller tasks include instructions for determining on/off commands for the first power source.

Additionally or alternatively, the hybrid vehicle further includes a transmission configured to receive the first and second torques and use one of at least two selectable gear ratios to deliver power to one or more drive wheels of the hybrid vehicle; wherein: the low-level controller tasks comprise instructions for calculating a gear ratio request for delivery to the transmission; and the model of the low-level controller used by the high-level controller includes a model of the low-level controller calculating a gear ratio request. Additionally or alternatively, the instructions for calculating a gear ratio request include: identifying feasible gear ratios; calculating wheel torque request to transmission torque request ratios; finding an optimal torque split for each feasible gear ratio; calculating a cost for the optimal torque split for each feasible gear ratio; and selecting a gear ratio from the feasible gear ratios having the least cost. Additionally or alternatively, instructions for calculating a gear ratio request are configured to calculate the cost for the optimal torque split of each feasible gear ratio as a sum of a fuel power cost, and electric power cost, and a change cost.

Additionally or alternatively, high-level controller tasks include: using the preview information to estimate vehicle speed in a prediction window; combining the vehicle speed and preview information to estimate combined torque needed in the prediction window; calculating the optimal fuel consumption that meets the estimated combined torque needed in the prediction window to yield an optimized fuel equivalence factor; and communicating the optimized fuel equivalence factor to the low-level controller.

Additionally or alternatively, the low-level controller tasks include calculating an optimal torque split between first and second power sources using the current state and the fuel equivalence factor. Additionally or alternatively, the high-level controller tasks rely on a driver model to calculate the one or more low-level control variables, and the low-level controller tasks rely on driver control actions to calculate the first torque and the second torque. Additionally or alternatively, the high-level controller tasks use inputs from a navigation system to determine preview information, but not driver control actions, and the low-level controller tasks do not use inputs from the navigation system.

Still further examples include hybrid vehicles having a first power source in the form of a battery having a state of charge (SOC) and a motor configured to provide a first torque, a second power source configured to provide a second torque, and a control system as in any of the preceding control system examples.

Another illustrative and non-limiting example takes the form of a method of controlling a hybrid vehicle powertrain, the hybrid vehicle powertrain having a first power source in the form of a battery having a state of charge (SOC) and a motor configured to provide a first torque, and second power source configured to provide a second torque, the hybrid vehicle powertrain being controlled with each of: a high-level controller having an associated first memory, the first memory storing one or more readable instruction sets for high-level controller tasks; a low-level controller having an associated second memory, the second memory storing one or more readable instruction sets for low-level controller tasks; wherein the method comprises the high-level controller: receiving preview information related to a travel path for the hybrid vehicle, and one or more current state variables for the vehicle; using a model of the low-level controller, one or more models of system dynamics for the hybrid vehicle, and the one or more current state variables, calculating an optimal fuel consumption over a prediction horizon including a portion of the travel path, and calculating one or more low-level control variables for use by the low-level controller; and communicating the one or more low-level control variables to the low-level controller; and the method further comprises the low-level controller: receiving the one or more low-level control variables from the high-level controller and one or more current state variables for the hybrid vehicle; calculating the first torque and the second torque to provide optimal fuel consumption within minimum and maximum limits for each of the first torque and second torque; and issuing control signals to the first and second power sources based on the first torque and the second torque.

Additionally or alternatively, the high-level controller calculates the one or more control values at a first sampling rate; the low-level controller calculates the first torque, second torque, and on/off signal at a second sampling rate; and the second sampling rate is a faster sampling rate than the first sampling rate. Additionally or alternatively, second power source uses a fuel, and the method includes the low-level controller determining and issuing on/off commands for the first power source.

Additionally or alternatively, the hybrid vehicle includes a transmission configured to receive the first and second torques and use one of at least two selectable gear ratios to deliver power to one or more drive wheels of the hybrid vehicle; wherein the method further includes: the low-level controller calculating a gear ratio request for delivery to the transmission and issuing the gear ratio request to the transmission; and the model of the low-level controller used by the high-level controller includes a model of the low-level controller calculating a gear ratio request.

Additionally or alternatively, the low-level controller calculates the gear ratio request by: identifying feasible gear ratios; calculating wheel torque request to transmission torque request ratios; finding an optimal torque split for each feasible gear ratio; calculating a cost for the optimal torque split for each feasible gear ratio; and selecting a gear ratio from the feasible gear ratios having the least cost. Additionally or alternatively, the low-level controller calculates the cost for the optimal torque split of each feasible gear ratio as a sum of a fuel power cost, and electric power cost, and a change cost.

Additionally or alternatively, the method further comprises the high-level controller: using the preview information to estimate vehicle speed in a prediction window; combining the vehicle speed and preview information to estimate combined torque needed in the prediction window; calculating the optimal fuel consumption that meets the estimated combined torque needed in the prediction window to yield an optimized fuel equivalence factor; and communicating the optimized fuel equivalence factor to the low-level controller. Additionally or alternatively, the method further comprises low-level controller calculating an optimal torque split between first and second power sources using the current state and the fuel equivalence factor. Additionally or alternatively, the method further comprises the high-level controller using a driver model to calculate the one or more low-level control variables, and the low-level using actual driver control actions to calculate the first torque and the second torque. Additionally or alternatively, the method further comprises the high-level controller using inputs from a navigation system to determine preview information, but not driver control actions.

Still further examples include hybrid vehicles having a first power source in the form of a battery having a state of charge (SOC) and a motor configured to provide a first torque, a second power source configured to provide a second torque, and a control system having a high-level controller and a low-level controller, configured to perform methods as in any of the preceding method examples.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
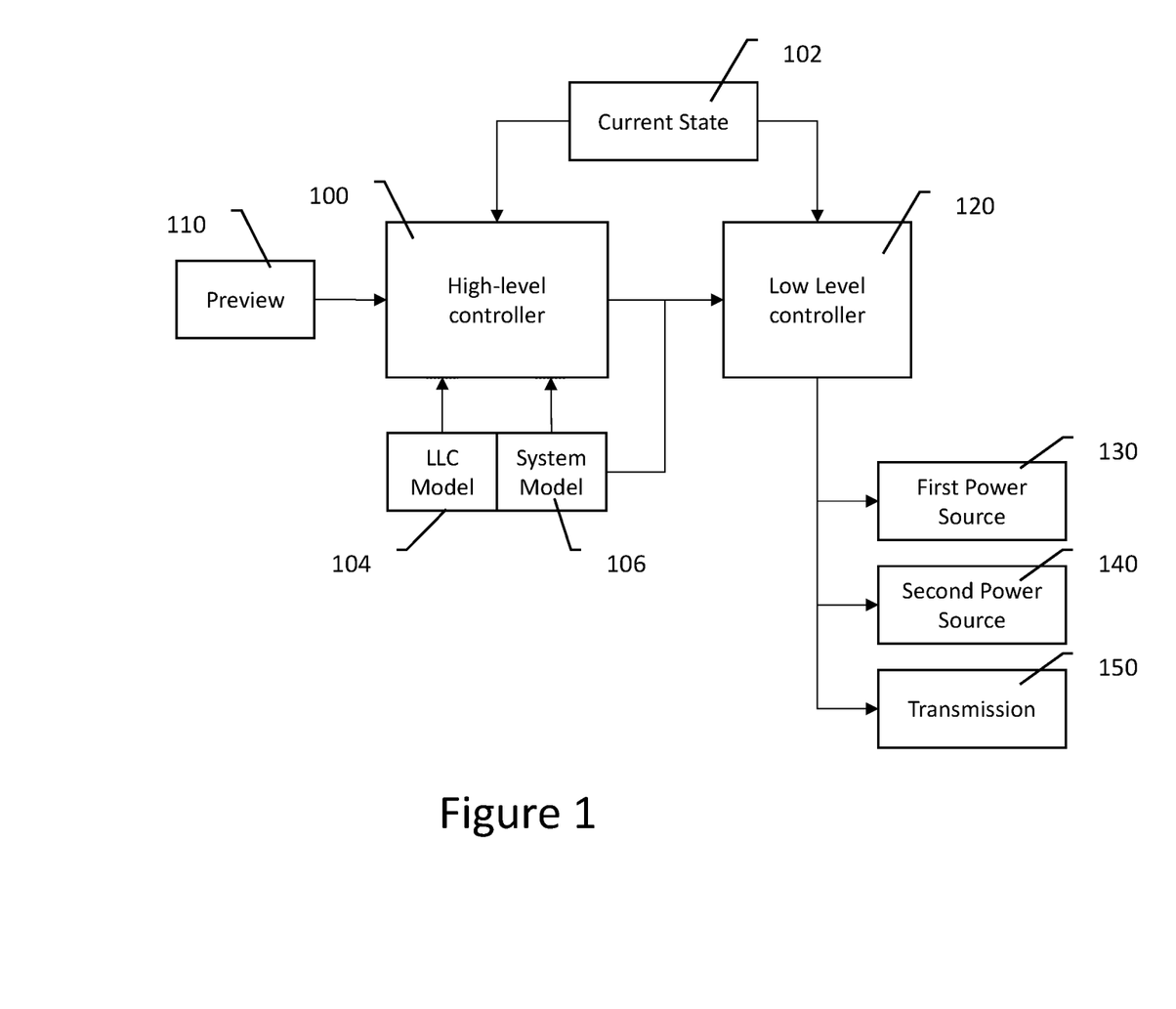
FIG. 1 is a block diagram of an overall control architecture.

FIG. 1 is a block diagram of an overall control architecture. A high-level controller 100 obtains current state data 102 which may include, for example, and without limitation, current wheel torque request, current vehicle/wheel speed, current battery SOC and current auxiliary electrical power demand. The high-level controller 100 also obtains preview information 110, which is used to determine, for example and without limitations, wheel torque requests, future vehicle/wheel speeds, future battery SOC estimates, and/or future auxiliary electrical power demands. The preview information may be obtained using prediction models (e.g. driver prediction model, lead vehicle prediction model, auxiliary electric power prediction models, etc.).

In an illustrative example, the preview information 110 may be obtained as by using navigation system data, which may be obtained by communication to a remote server, such as by cellular or other communications. The navigation system data may include information about upcoming roadway. For example, knowing a destination, mapped route, or the currently traveled road, the system may determine data including speed limits, expected driver behavior, and/or traffic data to construct a speed profile that the vehicle may be expected to follow. In some examples, a driver prediction model may be used to predict the behavior of a driver. For example, in some embodiments, it may be assumed that the vehicle, from a current speed, will accelerate to the legal speed limit, or another speed limit such as a comfort-based speed limit (taking into account road curvature and vehicle sway limits, for example), or until a lead vehicle is reached, and will then stay at the speed limit or at a safe following distance from the lead vehicle. The preview information may also include traffic signal information, with the speed profile further adjusted to consider the effect of, for example and without limitation, upcoming stop lights that would require the vehicle to slow or stop and then accelerate, if desired.

The speed profile can then be used to estimate a total force or total torque demand of the vehicle needed to traverse the upcoming roadway by accounting for drag, road curvature, road grade, etc. The torque demand may comprise a series of samples sufficient to traverse at least portion of the upcoming roadway in a prediction horizon, such as several seconds, tens of seconds, or longer, as desired. Additionally, the current and/or anticipated future demands of auxiliary power may be added to the torque demand. Other preview information 110 may be obtained, and the preview information need not be calculated according to this particular example.

The high-level controller 100 will also use models of the low-level controller 104 and a system model 106 capturing system dynamics and limitations. The model of the low-level controller may include analyses that the low-level controller would use to determine output settings, including the equations shown below in greater detail. The system model 106 may, for example, incorporate a model of a motor generator unit, for example, using an (MGU) efficiency map relating electric motor efficiency with, for example, electric motor speed, electric motor torque and/or electric motor power. The system model 106 may also include, for example, models of the other power source, such as a fuel cell or internal combustion engine, including an engine map which provides engine efficiency data for engine speed and torque demands. The system model 106 may also incorporate fuel consumption and electrical power consumption per engine start event, which can be used to calculate an engine start/stop penalty. The high-level controller can utilize a dynamic model of battery relating battery SOC evolution with applied electric power (both charging and discharging).

Using preview information and prediction models, the high-level controller optimizes tuning parameters and/or other control inputs of the low-level controller such that a chosen cost function evaluated over the prediction horizon is minimized. The cost function can comprise terms related to fuel consumed over the prediction horizon, SOC limits violations and others. While the following discussion focuses on a fuel efficiency driven approach, in other examples, other or additional factors may be included. For example, carbon or other emissions (NOx) may be modeled and used in the calculation. For example, generation of carbon dioxide as a product of combustion may be considered alone or alongside other emissions in the optimization calculation used in the low-level controller, with the model mirrored in the high-level controller.

The high-level controller can consider that the tuning of the low-level controller can be adjusted at any time over the prediction horizon (resulting in N sets of optimal tuning parameters, where N is the length of the prediction horizon) or only at specific time instances (resulting in less than N sets of optimal tuning parameters).

A specific example includes the high-level controller 100 calculating the equivalence factor λ, for a low-level controller that implements an Equivalent Consumption Minimization Strategy (ECMS). An ECMS approach optimizes the power split between the power sources (engine and MGU, for example) to minimize energy consumption. The equivalence factor λ, can be understood as the conversion coefficient between fuel energy and electric energy. Because the analysis operates across a prediction horizon, which may be several to tens of seconds, or more, as desired, a series of optimized equivalence factors will be generated as a time vector $\lambda,*=\{\lambda^*(1), \lambda^*(2), \lambda^*(3)\ \lambda^*(n)\}$. At least a first sample of the series of optimized equivalence factors is communicated by the high-level controller to the low-level controller, which uses the received optimized equivalence factor as a tuning parameter for executing control operations. The analysis occurs in an environment which changes quickly as the vehicle moves, and so only one or a few samples of the calculated series of optimized equivalence factors may be used before the calculation is started over.

In an illustrative example, the high-level controller 100 is configured or programmed (by storage of machine executable instructions/code on non-transitory media) to minimize the cost function:

$$\lambda^* = \arg\min J_{HL}(\lambda) \qquad \{\text{Eq. 1}\}$$

In which λ, is the vector of equivalence factors optimized over the whole prediction horizon, and λ* is the optimal equivalence factor vector. The cost function, Jim is the high-level controller cost function, further described here:

$$J_{HL}(\lambda)=\phi(SOC_N(u^*_{LL}(\lambda)))+\Sigma_{i=0}^{N-1}L^i(SOC_i(u^*_{LL,i}(\lambda)),$$
$$u^*_{LL,i}(\lambda),v_i,\tau_{whl,i}) \quad \{Eq.\ 2\}$$

Wherein ϕ is the terminal term of the high-level cost function and represents a penalty for violating the state-of-charge (SOC) limits on the battery at the end of the prediction horizon. The penalty may be applied, for example, if a target SOC is not met, or if the SOC goes outside of high or low boundaries, where different penalty weights may apply based on one or more of which violation occurs, how long the violation endures, and how far out of bounds the violation is, for example. N is the length of the prediction horizon in samples, and i is the discrete time instance. As noted the low-level controller is modeled, and so the $u^*_{LL}$ term represents the optimal low-level control action (control actions may include, without limitation, engine torque request, engine ON/OFF request, and/or transmission gear request) given by the ECMS prediction as modeled by the high-level controller. Also in Equation 2, $v_i$, $\tau_{whl,i}$ are the vehicle speed and wheel torque request, respectively, for the ith element of the time series. $L^i$ is the integral term of the high-level controller cost function consisting of the fuel consumed over the prediction horizon and violation of the SOC limits during the prediction horizon, and is further described in Equation 3:

$$L^i=\dot{m}_{fc}(u^*_{LL,i}(\lambda),u^*_{LL,i-1}(\lambda),v_i)+K_{\overline{SOC}}\min$$
$$(\overline{SOC}_i-SOC_i(u^*_{LL,i}(\lambda)),0)^2+K_{\underline{SOC}}\max(\underline{SOC}_i-$$
$$SOC_i(u^*_{LL,i}(\lambda)),0)^2 \quad \{Eq.\ 3\}$$

In Equation 3, $\dot{m}_{fc}$ is the fuel consumption rate, factoring in the optimal low-level control action (as modeled) relative to the preceding control action at the vehicle speed. The next terms, $K_{\overline{SOC}}$, and $K_{\underline{SOC}}$ are weights for violation of upper or lower SOC limits within the prediction horizon.

Next:

$$\phi=K_{\overline{SOC},N}\min(\overline{SOC}_N-SOC_N(u^*_{LL}(\lambda)),0)^2+K_{\underline{SOC},N}\max(\underline{SOC}_N-SOC_N(u^*_{LL}(\lambda)),0)^2 \quad \{Eq.\ 4\}$$

As noted above, ϕ may be a penalty for violation of SOC limits at the end of the prediction horizon (the Nth sample), where Equation 4 illustrates how the weights and Max/Min calculations are performed. The high-level controller models a series of control actions by the low-level, yielding the three control signals noted in Equation 5:

$$u^*_{LL,i}(\lambda)=\{\tau^*_{ice}(\lambda),eng^*_{on}(\lambda),G^*(\lambda)\}_i \quad \{Eq.\ 5\}$$

Wherein $u^*_{LL,i}$ term represents the optimal low-level control action as modeled by the high-level controller, and $\tau^*_{ice}$, $eng^*_{on}$, and $G^*$ are, respectively, the optimal engine torque, engine on/off, and gear ratio request calculated by the low-level controller as modeled by the high-level controller. As noted, the low-level controller may use an ECMS control scheme, and so the high-level controller may model the low-level controller for ECMS control. If a different control scheme is used by the low-level controller, the high-level controller can be adjusted accordingly. Some examples may further extend the ECMS control scheme to account for additional variables, such as battery wear, other component health/aging, emissions, etc.

Equation 6 describes the modeled optimal MGU torque:

$$\tau^*_{mgu,i}(u^*_{LL,i}(\lambda),\tau_{whl,i})=\frac{\tau_{whl,i}}{G^*_i(\lambda)}-\tau^*_{ice,i}(\lambda)eng^*_{on}(\lambda) \quad \{Eq.\ 6\}$$

Where $\tau^*_{mgu,i}$ is the optimized, modeled MGU torque request for the $i^{th}$ sample, as a function of the optimal low-level controller action. As shown, the MGU torque request would result from the wheel torque request, divided by the gear ratio request, less torque supplied by the second power source (the engine or internal combustion engine (ICE) in these equations), which is the product of the second power source torque request and the on/off control signal for the second power source, both of which are the modeled requests as functions of the vector of equivalence factors.

The high-level controller will also determine the SOC for the MGU battery:

$$SOC_{i+1}=f(SOC_i,\tau^*_{mgu,i}eng^*_{on,i}(\lambda),eng^*_{on,i-1}(\lambda),$$
$$G_i^*(\lambda),v_i) \quad \{Eq.\ 7\}$$

Where the SOC for i+1 is a function of the preceding SOC sample, and the optimal MGU and second power source torques, optimal second power source on/off request (shown in the equations as an engine on/off request), optimal gear request, and vehicle speed.

Engine on/off may, in some examples, be handled by the low-level controller (noting the below discussion of functions limited by the particular hybrid powertrain architecture). In a non-limiting example, the engine on/off may be handled by extending the ECMS algorithm using instantaneous optimization in the engine torque optimization. For example, ECMS provides fuel-optimal engine torque and engine on/off signals for the particular time sample using current time sample. In an example, the low-level controller may determine no engine torque is needed, and the engine can be off, and so the low-level controller makes such a determination and issue the off signal to the engine; when torque is again needed from the engine, the low-level controller makes that determination and issues an on or start signal to the engine. The high-level controller simulates the model of the low-level controller by obtaining engine torque and engine on/off for each sample in the preview window, and then optimizes the low-level controller parameters so that control is optimal for the current time sample and also with respect to the prediction horizon. For example, the high-level controller may augment the low-level controller model to use engine start or engine stop penalties when modelling low-level controller actions, so that an energy-optimal set of parameters is provided to the low-level controller, rather than having to track both an optimization problem and a rule set for engine on/off. Other schemes may be used within the hierarchical control strategy for engine on/off and/or transmission gear setting.

When the high-level controller models the low-level control signals, the cost function minimization may be expressed as shown in Equation 8:

$$u^*_{LL,i}(\lambda)=\arg\min H^i(u^*_{LL,i}(\lambda),u_{LL,i-1}(\lambda),\tau_{mgu,i}) \quad \{Eq.\ 8\}$$

The cost function may be expressed as:

$$H^i=P_{\{f\},i}(u_{LL,i}(\lambda),u_{LL,i-1}(\lambda),v_i)+\lambda_i P_{\{e\},i}(\tau_{mgu,i},eng_{on,i}(\lambda),eng_{on,i-1}(\lambda),G_i(\lambda),v_i)+R_{\Delta u}\Delta\tau_{ice,i} \quad \{Eq.\ 9\}$$

Wherein $P_{\{f\}}$ represents power consumed by fuel path, which results from the second source fuel usage as dictated by the current and prior control signals and vehicle speed, $v_i$, $P_{\{e\}}$ represents power consumed by electrical path (including battery power consumption and on/off event), and the last factor, $R_{\Delta u}$ is the weight penalizing a change of second power source (often an internal combustion engine, though other power sources may be used) torque request $\Delta\tau_{ice,i}$.

The MGU torque can be determined from the second power source torque, wheel torque and gear requests as:

$$\tau_{mgu,i}(u_{LL,i}(\lambda), \tau_{whl,i}) = \frac{\tau_{whl,i}}{G_i(\lambda)} - \tau_{ice,i}(\lambda)eng_{on,i}(\lambda) \quad \{Eq.\ 10\}$$

The power consumed by the fuel path is characterized by Equation 11:

$$P_{\{f\},i} = \dot{m}_{fc}(u_{LL,i}(\lambda), u_{LL,i-1}(\lambda), v_i) \cdot LHV \quad \{Eq.\ 11\}$$

Where $\dot{m}_{fc}$ is the fuel consumption rate, and LHV is the Lower heating value of fuel, such that the power consumed is the product of the fuel usage and the LHV. Power consumed by the electrical path is characterized by Equation 12:

$$P_{\{e\},i} = \eta(u_{LL,i}(\lambda), \tau_{whl,i}, v_i) \cdot P_{\{MGU\}}(\tau_{mgu,i}, u_{LL,i}(\lambda), u_{LL,i-1}(\lambda), v_i) \quad \{Eq.\ 12\}$$

Where η is the MGU efficiency, which may vary as indicated with the control signals received, the wheel torque request, and vehicle speed. The MGU power consumption, $P_{\{MGU\}}$, is related to the torque request the MGU receives, the vehicle speed, and the current and prior control signals.

The high-level controller may subject the modeled optimization of low-level controller behavior to the following constraints:

$$\underline{\tau}_{ice,i} \leq \tau_{ice,i} \leq \overline{\tau}_{ice,i}$$

$$\underline{\tau}_{mgu,i} \leq \tau_{mgu,i} \leq \overline{\tau}_{mgu,i}$$

$$eng_{on,i} \in \{0,1\}$$

$$G_i \in \{g_1, \ldots, g_{M_i}\}_i \quad \{\text{Constraints 1}\}$$

Here, $\underline{\tau}_{ice,i}, \overline{\tau}_{ice,i}$ are the lower/upper limits for second power source (such as an engine or ICE) torque over the prediction horizon, $\underline{\tau}_{mgu,i}, \overline{\tau}_{mgu,i}$ are the lower/upper limits for MGU torque over the prediction horizon, and $\{g_1, \ldots, g_{M_i}\}_i$ are the set of gear ratios admissible at time i calculated with respect to transmission input speed/torque limits.

As illustrated in the above detailed example, the high-level controller calculates an optimized time vector of equivalence factors λ by selecting, for each time point, an optimal equivalence factor that minimizes fuel consumption over the entire window, adjusted to account for any violations of SOC regular limits and/or terminal limits (terminal limits may include an end-of-period SOC target), constrained by overall system requirements. Further in this example, the equivalence factor is then communicated to the low-level controller and is used as a tuning parameter of the ECMS implemented in the low-level controller.

The high-level controller may perform its model-based optimization calculation using preview data and current system state at a relatively lower repetition rate than the low-level controller. For example, the high-level controller may perform an analysis at intervals of about 0.1 seconds to about 10 seconds, or about 0.5 seconds to about 3 seconds, or about 1-2 seconds, in various examples. The low-level controller will perform actual optimization using the equivalence factor that it receives from the high-level controller, using analysis analogous to Equations 8-12 above, in response to demands placed on it by the road (grade, curvature, etc.), driver (whether human or autonomous), losses (friction, drag), and any other inputs (auxiliary electrical system usage for example). The low-level controller may perform its analysis at a higher frequency in the range of about 10 kHz to about 100 Hz, for example. In one example, the high-level controller operates at 1 Hz (1 second interval), and the low-level controller operates at 100 Hz (0.01 second interval). That is, the low-level controller may operate at a sampling rate that is at least twice, or at least ten times, or at least one-hundred times the sampling rate of the high-level controller. The difference in repetition rate of the two controllers is optional.

The high-level controller 100 communicates the first elements of the optimal tuning parameters (corresponding to at least the first time instance over the prediction horizon) to the low-level controller 120. For example, if the low-level controller implements ECMS and the high-level controller optimizes N samples of λ over the prediction horizon, then λ*(1), corresponding to the first element of the optimal vector λ*, is communicated to the low-level controller. Similarly, several first elements can be communicated directly if the high-level optimization is executed less often than the sampling time of the high-level optimization and the samples provided cover a longer time period than is present between iterations of the high-level control scheme. For example, if the high-level controller performs its analysis each second, and uses 0.1 seconds as the time interval of its analysis, then ten samples of the optimized vector would be provided. In other examples, the high-level controller analysis uses a sampling time period that is equal to the repetition rate of the high-level controller, so only one sample is provided to the low-level controller.

Constraints for the optimized low-level controller tuning parameters (e.g. maximum change of the parameters to prevent abrupt changes of the low-level controller behavior) can be considered. Models used by the high-level controller may or may not be the same as models used by the low-level controller.

In an example, the low-level controller uses formulas analogous to those of Equations 8-12 above, as shown in the following section. As updated to reflect the low-level controller receiving λ*(1) from the high-level controller, the cost function minimization may be expressed as shown in Equation 13:

$$u^*_{LL,j}(\lambda^*(1)) = \arg\min H^j(u_{LL,j}(\lambda^*(1)), u_{LL,j-1}, \tau_{mgu,j}) \quad \{Eq.\ 13\}$$

The cost function may be expressed as:

$$H^j = P_{\{f\},j}(u_{LL,j}(\lambda^*(1)), u_{LL,j-1}, v_j) + \lambda^*(1)P_{\{e\},j}(\tau_{mgu,j}, eng_{on,j}(\lambda^*(1)), eng_{on,j-1}, G_j(\lambda^*(1)), v_j) + R_{\Delta u}\Delta\tau_{ice,j} \quad \{Eq.\ 14\}$$

Where $P_{\{f\}}$ represents power consumed by fuel path, which results from the second source fuel usage, $P_{\{e\}}$ represents power consumed by electrical path (including battery power consumption and on/off event), and the last factor, $R_{\Delta u}$ is the weight penalizing a change of second power source (often an internal combustion engine, though other power sources may be used) torque request $\Delta\tau_{ice}$.

The MGU torque can be determined from the second power source torque, wheel torque and gear requests as:

$$\tau_{mgu,j}(u_{LL,j}(\lambda^*(1)), \tau_{whl,j}) = \frac{\tau_{whl,j}}{G_j(\lambda^*(1))} - \tau_{ice,j}(\lambda^*(1))eng_{on,j}(\lambda^*(1)) \quad \{Eq.\ 15\}$$

The power consumed by the fuel path is characterized by Equation 16:

$$P_{\{f\},j} = \dot{m}_{fc}(u_{LL,j}(\lambda^*(1)), u_{LL,j-1}, v_j) \cdot LHV \quad \{Eq.\ 16\}$$

Where $\dot{m}_{fc}$ is the fuel consumption rate, and LHV is the Lower heating value of fuel, such that the power consumed is the product of the fuel usage and the LHV. Power consumed by the electrical path is characterized by Equation 17:

$$P_{\{e\},j} = \eta(u_{LL,j}(\lambda^*(1)), \tau_{whl,j}, v_j) \cdot P_{\{MGU\}}(\tau_{mgu,j}, u_{LL,j}(\lambda^*(1)), u_{LL,j-1}, v_j) \quad \{Eq.\ 17\}$$

Where η is the MGU efficiency obtained from the MGU map, which may vary as indicated with the control signals received, the wheel-torque request, and vehicle speed, and the MGU power consumption is related to the torque request the MGU receives, the vehicle speed, and the current and prior control signals.

The constraints for the low-level controller optimization include:

$$\underline{\tau}_{ice,j} \leq \tau_{ice,j} \leq \bar{\tau}_{ice,j}$$

$$\underline{\tau}_{mgu,j} \leq \tau_{mgu,j} \leq \bar{\tau}_{mgu,j}$$

$$eng_{on,j} \in \{0,1\}$$

$$G_j \in \{g_1, \ldots, g_{M_j}\} \quad \{\text{Constraints 1}\}$$

Here, $\underline{\tau}_{ice,j}, \bar{\tau}_{ice,j}$ are the lower/upper limits for second power source (such as an engine or ICE) torque over the prediction horizon, $\underline{\tau}_{mgu,j}, \bar{\tau}_{mgu,j}$ are the lower/upper limits for MGU torque over the prediction horizon, and $\{g_1, \ldots, g_{M_j}\}$ are the set of gear ratios admissible at time/calculated with respect to transmission input speed/torque limits.

Returning to FIG. 1, the preview information 110 and current state 102 are used by the high-level controller, along with the low-level controller model 104 and system model 106 to calculate the optimized time vector of equivalence factors λ*. At least a first sample of the optimized time vector of equivalence factors λ*(1) is communicated to the low-level controller 120. The low-level controller 120 calculates an optimized solution using data from the current state 102, the tuning parameter λ*(1), and the system model 106 to calculate control signals issued to each of the first power source 130, second power source 140, and transmission 150. For example, the first power source 130 may be an engine (a fuel cell, gasoline, diesel, propane, natural gas, hydrogen, or any other suitable chemistry and/or technology, any of which may be an engine as used herein), and receives from the low-level controller 120 a first power source torque request (also referenced herein as engine torque request or ICE torque request, where ICE indicates an internal combustion engine), as well as a first power source on/off request. The second power source 140 may be an MGU/electric motor, which is coupled to a rechargeable battery, and receives an MGU or electric motor torque request.

The transmission 150 receives a gear request in some examples. In some examples, the transmission 150 may be a continuously variable transmission, in which case the above formulas would be modified to optimize the transmission gear request on a continuum, rather than by use of discrete gear ratios.

The low-level controller will use the received first sample of the optimized time vector of equivalence factors λ*(1) for several iterations of the low-level control analysis in some examples. For example, the analysis in the low-level controller may occur at 10 to 1000 Hz, with the same λ*(1) for an entire second (10 to 1000 iterations), while the data received regarding current state 102 would update with each iteration as new data samples are received. In an example the low-level controller operates at a frequency that is at least ten times, or in the alternative, about ten times, that of the high-level controller. Continuing the example, the high-level controller may operate to recalculate the optimized time vector at one second intervals, so that only one sample is used from each calculation. Other approaches and configurations may be used instead.

In some examples, the high-level controller may perform its analysis at set intervals, and may generate an optimized time vector of equivalent factors with each element of the vector for use at a different interval. For example, the high-level controller may calculate optimized time vector of equivalence factors λ* at one-second intervals, with samples within the vector configured for use in 100 millisecond intervals, such that ten samples of λ* would be communicated, each for use in at least one iteration of the low-level controller analysis. Continuing the example, if the low-level controller operates at 100 Hz, then each sample of the optimized time vector of equivalence values would be used for 10 iterations of the low-level controller analysis.

Figure 2:
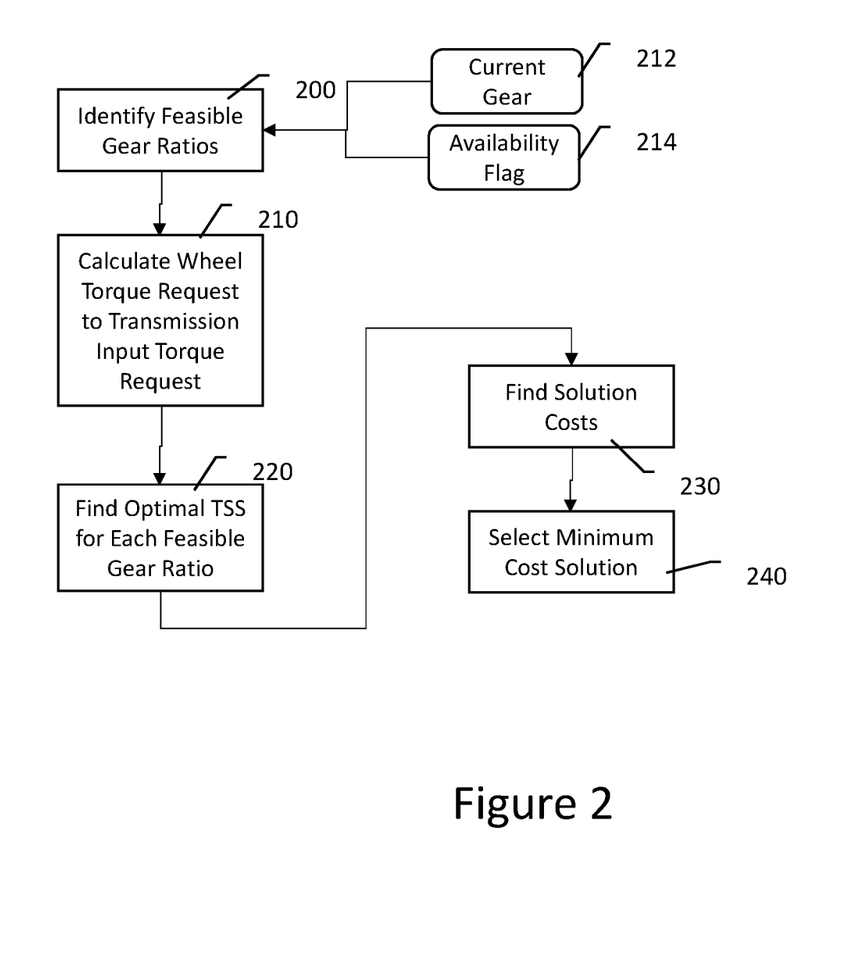
FIG. 2 is a block flow diagram for a method of gear selection.

FIG. 2 is a block flow diagram for a method of gear selection. At 200, the method determines feasible gear ratios. Such analysis may include identifying the current gear 212 and determining whether gear change is available as noted at 214. For example, after a gear change, the system may require waiting at least a minimum time before a subsequent gear change (500 milliseconds to 5 seconds, for example), to avoid too-frequent gear shifting which may not be possible as the mechanical action takes a certain minimum amount of time, and/or because too-frequent gear shifting can impair driver comfort and/or create wear on the clutch/transmission. The feasible gear ratios 200 may be, for example and without limitation, the current gear, the current gear plus one (unless in highest gear), and the current gear minus one (unless in lowest gear); plus/minus two may also be included if double shifting is allowed. Feasible gear ratio may also contemplate range changes, as desired, for transmissions having multiple range and gear choices available.

Next, as shown at 210, the method calculates the wheel torque request to transmission input torque request ratio for each feasible gear ratio. The optimal torque split solution (TSS) for each feasible gear ratio is then calculated, for example using the ECMS strategy, as indicated at 220. The solution cost for each feasible gear ratio is calculated at 230, using, for example, the following formula:

$$H_j = P_{\{f\},j} + \lambda^*(1) P_{\{e\},j} + R_{\Delta \tau} \Delta \tau_{ice,j} \quad \{\text{Eq. 18}\}$$

Where each of the powers and change costs shown in Equation 18 were defined above. The minimum cost is then selected as indicated at 240. With the optimal gear ratio request determined, the torque split and engine ON/OFF requests can then be calculated.

Figure 3:
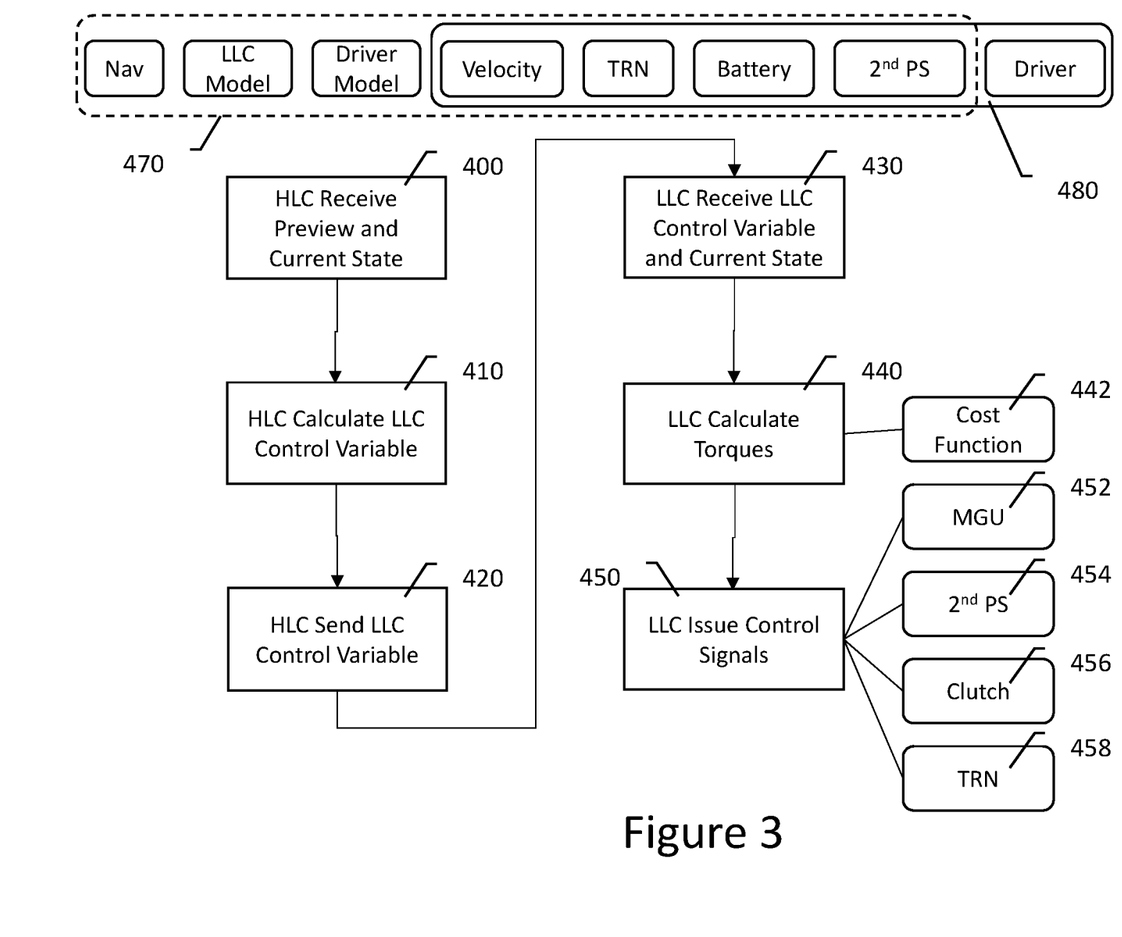
FIG. 3 is a block diagram for an overall method.

FIG. 3 is a block diagram for an overall method of controlling a hybrid vehicle. Starting at block 400, a high-level controller (HLC) receives preview and current state data. Such data may include information from various inputs shown at 470, including preview information from a navigation system (NAV), as modified or affected by a driver model, and current state information from the transmission (TRN), hybrid battery, and a second power source state ($2^{nd}$ PS). For example, the preview information can include navigation system data related to the upcoming roadway (whether determined using a travel map, or simply the road on which the vehicle is currently located), which may include road grade, road quality, road curvature, posted speed limits, current speed, weather, traffic and/or traffic control signal (stop lights, stop or yield signs, upcoming determinations such as a roundabout, etc.). Preview information from the navigation system may further include vehicle surroundings information, such as whether a lead vehicle is present, as well as how far way and how fast the lead vehicle is. The preview information may combine navigation system information with a driver model to calculate a vehicle speed profile. For example, the driver model may determine the degree of acceleration a driver may use to reach maximum speed, what the maximum speed is likely to be (relative to traffic and/or speed limits), following distance to lead vehicle. The driver model may be based on presumed characteristics of a "model" human driver, observed behaviors of an actual driver of the vehicle, or, for an autonomous vehicle, modeled behavior of the autonomous vehicle. Current state information may include, for example and without limitation, current gear selection of the transmission, hybrid battery SOC, and current status (On/Off and/or speed) of the $2^{nd}$ power source (as well as the first power source, which would be the hybrid MGU here, such as the speed thereof). Other current state information may include the current speed of the vehicle, as well as the state of any auxiliary power systems (passenger compartment or freight load heating/cooling, for example).

Using methods illustrated above, the HLC then calculates one or more LLC control variables 410. Block 410 may include the HLC using the LLC control model, as indicated previously. In some examples, the HLC determines a time vector λ* having a plurality of samples at 410, and communicates one or more samples of the calculated LLC control variable to the LLC at 420.

The LLC receives the LLC control variable at 430, and also obtains current state information. The current state information used in the LLC at block 430 may be different from that obtained by the HLC at 400. For example, the LLC may obtain driver control signals along with vehicle velocity, transmission gear ratio, hybrid battery data, state of the $2^{nd}$ power source, but, as noted, may not obtain one or more of a driver model and, optionally, navigation system inputs. In other examples, the LLC may use the driver model, and/or may use navigation system data.

The LLC then calculates torques for use by the MGU and the $2^{nd}$ PS, which may be an engine (gasoline, diesel, or other fuel), as indicated at 440. The torques may be calculated with reference to one or more cost functions 442, and minimized using a range of available techniques, such as an iterative solver (the same may occur in block 410 as well). The LLC then calculates and issues control signals as indicated at 450, including for example speed and torque to the first power source or MGU 452, speed, torque and/or On/Off signals to the second power source 454, signaling for the clutch 456 (which may decouple the second power source 454 when it is off, and recouple it when on), and gear selection or gear ratio to use (for continuously variable transmission) to the transmission 458.

In some examples, the HLC does not receive information about the driver's current control signaling (steering control, brake and/or accelerator pedals, for example) and instead determines an optimized control variable for the LLC to use by reliance on a driver model and navigation system inputs; the LLC in such examples may rely on the driver's current control signaling and the vehicle current state (vehicle speed, for example), but not on the data input from the navigation system and/or driver model. In other examples, the LLC may ignore the driver model only, but may include in its calculations data from the navigation system, such as by tailoring control actions in view of the upcoming roadway or traffic controls, if desired. Such tailoring may include, for example, identifying an upcoming stop sign or traffic light which will require stopping/slowing, and configuring torque split to charge the hybrid battery for use in acceleration after the upcoming stop. Such special tasking may be separate from other optimization activity or, instead, may be integrated in the driver prediction model.

Figure 4:
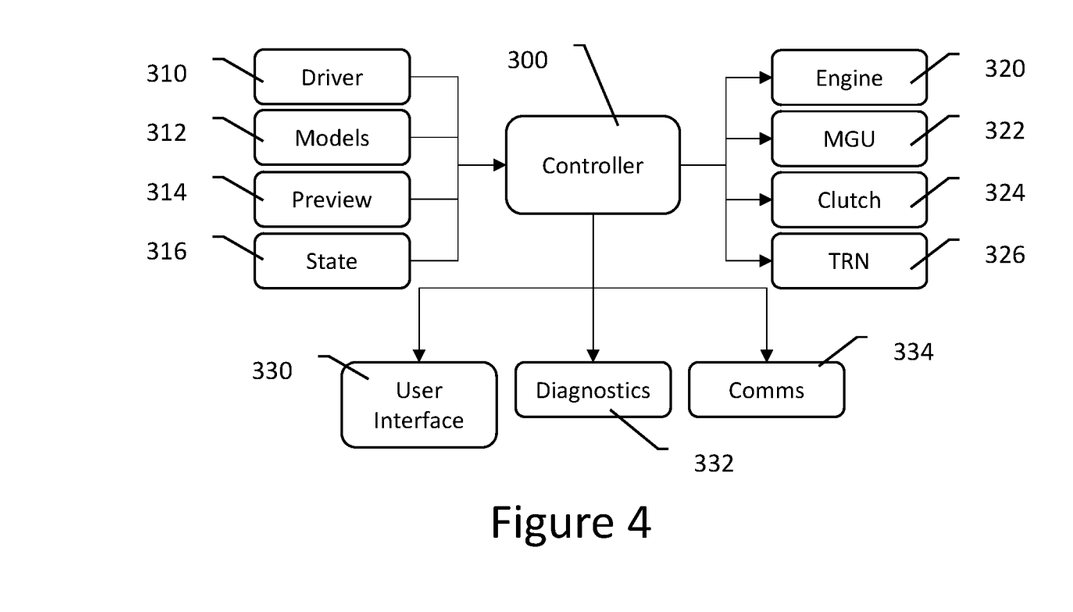
FIG. 4 shows an illustrative hybrid vehicle control architecture.
Figure 5:
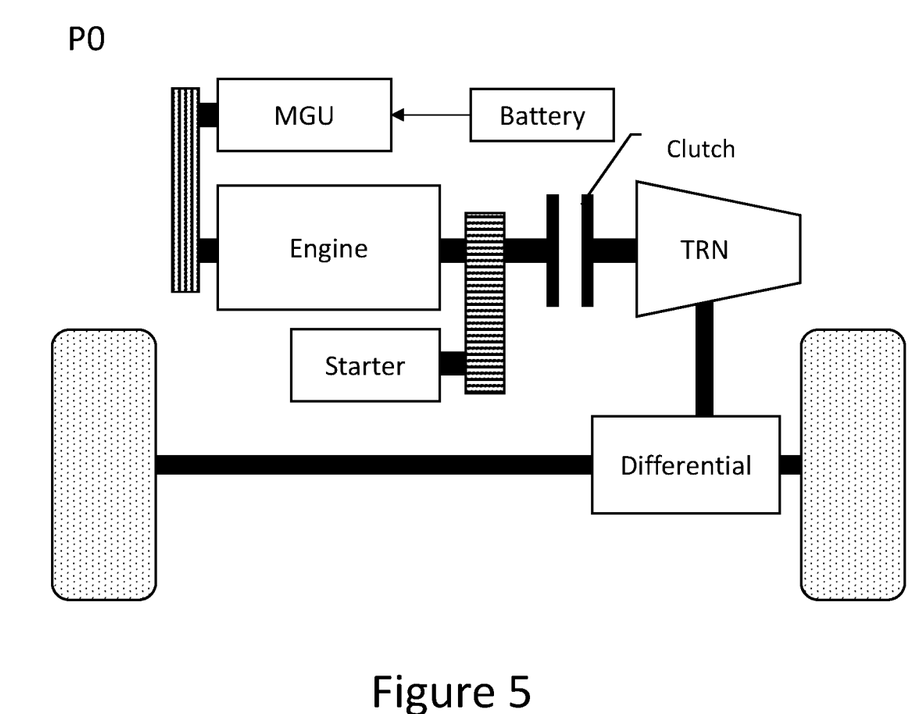
FIGS. 5-9 show several illustrative hybrid vehicle powertrain architectures.

FIG. 4 shows an overall control architecture. The overall control structure includes a vehicle controller 300 that receives data/inputs from each of a driver 310, various system models or other stored information 312, preview information 314 such as from navigation, communication, and vehicle sensors, and current state data 316 relating to the current status of the system (such as engine and battery sensors sensors), and generates control outputs for the engine 320, the MGU 322, a clutch 324, and transmission 326. The controller 300 may also output data to a user interface 330, allowing the driver to receive information about ongoing operations, to a diagnostics module 332 where operating data, anomalies, faults, etc. can be stored, and/or to a communication module 334 for transmission off vehicle, such as to a fleet manager.

FIGS. 5-9 show several illustrative hybrid vehicle configurations. A P0 hybrid in FIG. 5 includes a battery that powers the MGU, which is coupled by a belt to the transmission drive shaft, which is also coupled to the engine. The engine and MGU cannot be decoupled here. A starter for the engine is also belt coupled to the transmission drive shaft. A clutch separates the transmission from the drive shaft. The transmission outputs torque to the differential, which couples to the drive wheels as shown.

Figure 6:
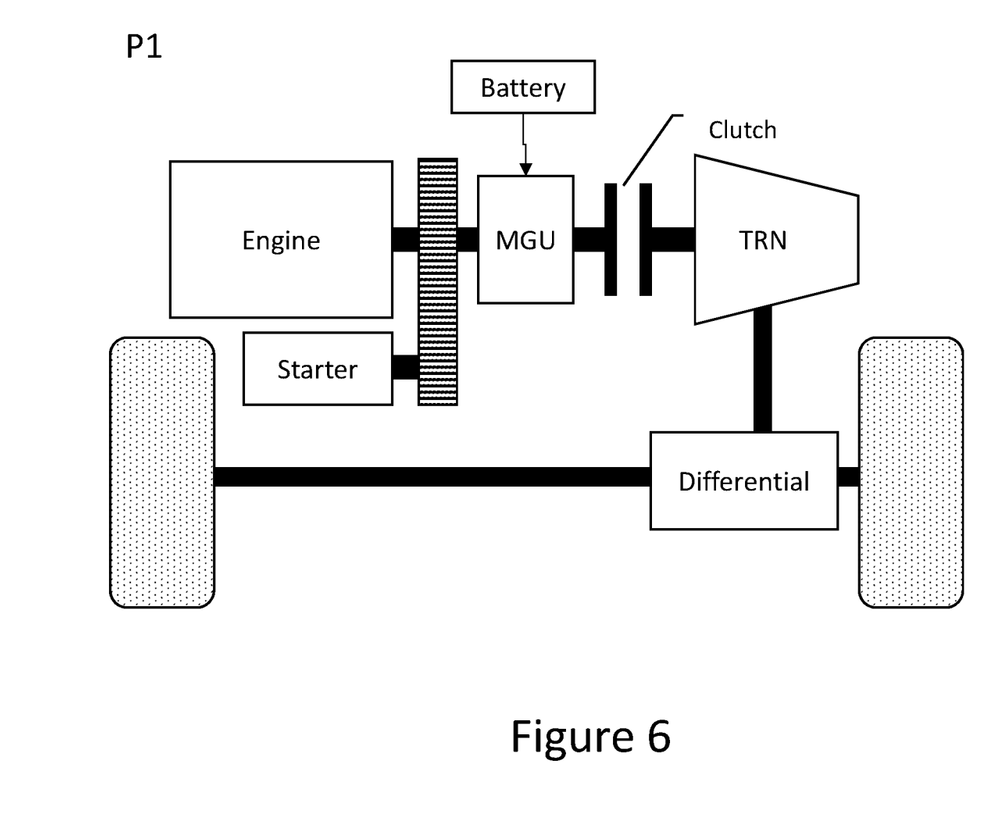

A P1 hybrid in FIG. 6 moves the MGU on the other side of the engine, and places it directly on the drive shaft. A starter for the engine is belt coupled to the transmission drive shaft. The engine and MGU cannot be decoupled here. A clutch separates the transmission from the drive shaft. The transmission outputs torque to the differential, which couples to the drive wheels as shown. The above described controller scheme and associated analysis can be applied to a P0 or P1 hybrid powertrain architecture with minor changes. One adjustment is that the engine cannot be turned off while the vehicle is moving, because the MGU and ICE are coupled together. As a result, engine on/off can only be used when the vehicle is stopped.

Figure 7:
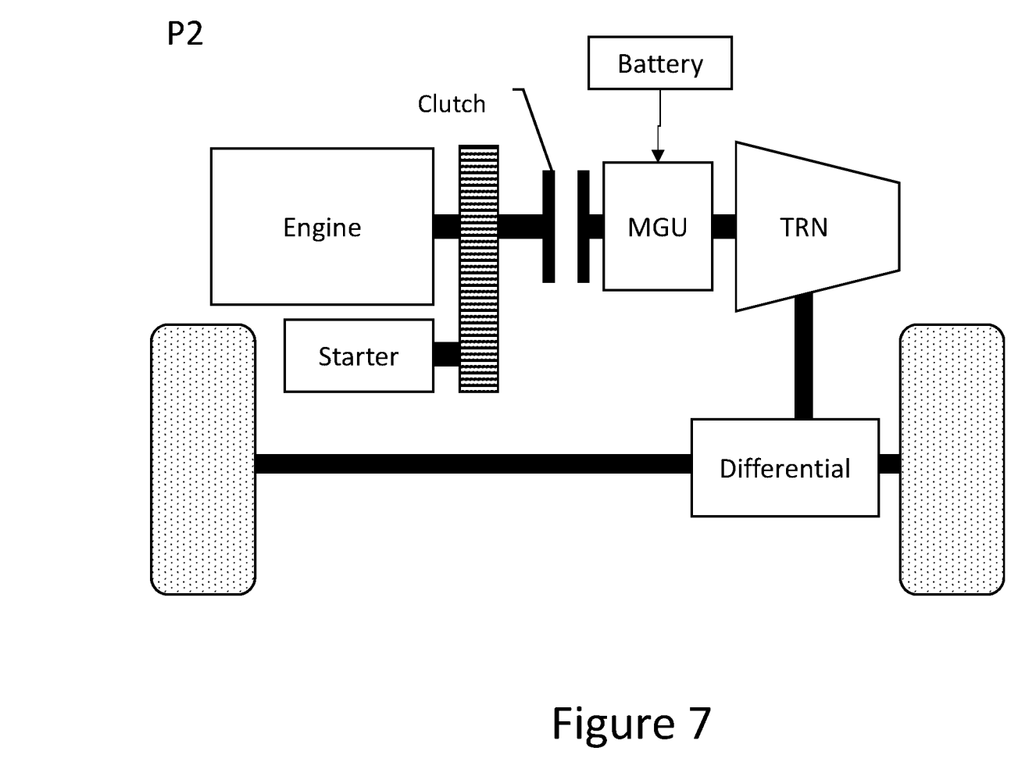

A P2 hybrid in FIG. 7 moves the MGU on the other side of the clutch. Here the engine and starter are coupled on one side of the clutch, and can be decoupled from the MGU and transmission. This makes the engine-off decision more useful. The MGU is not allowed to decouple, however. The transmission outputs torque to the differential, which couples to the drive wheels as shown.

Figure 8:
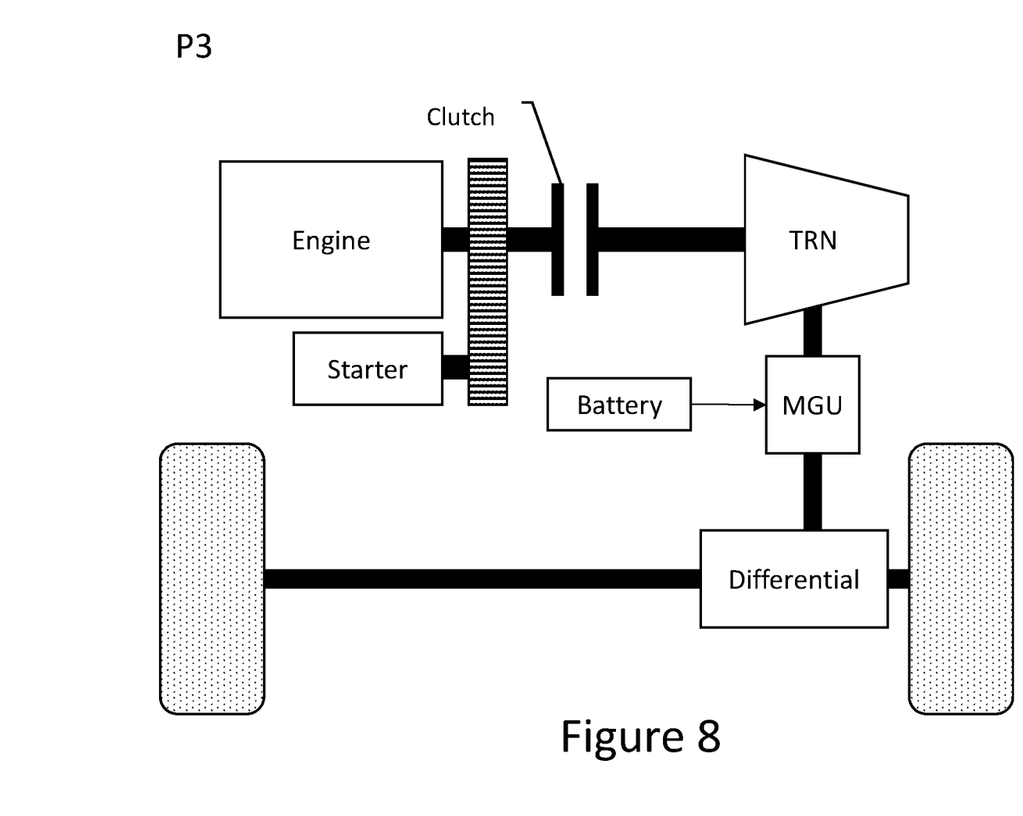
Figure 9:
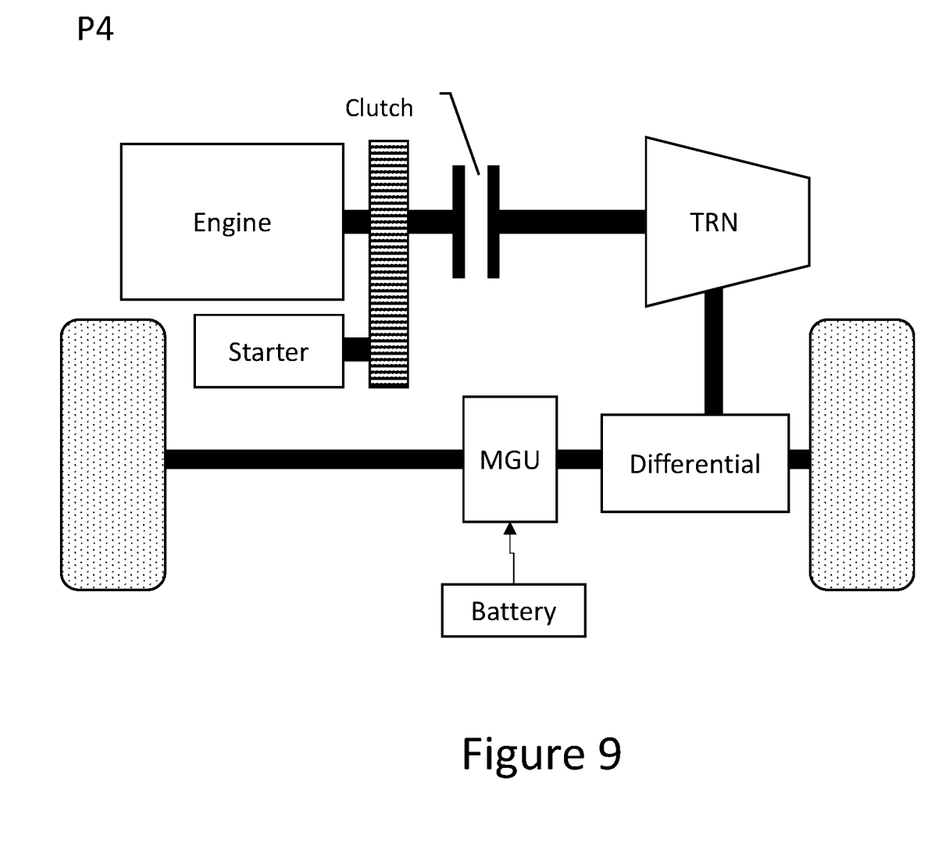

A P3 hybrid in FIG. 8 now places the engine, starter and clutch as with P2, but moves the MGU to a location between the transmission and the differential. A P4 hybrid in FIG. 9 places the MGU on the other side of the differential. An alternative to the P4 hybrid may include plural MGUs on each of the drive wheels. The above described controller is readily applied in each of the P2, P3 and P4 hybrid powertrain configurations.

Each of these non-limiting examples can stand on its own, or can be combined in various permutations or combinations with one or more other examples. The description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A control system for a hybrid vehicle, the hybrid vehicle having a first power source that is a battery having a state of charge and a motor configured to provide a first torque, and a second power source configured to provide a second torque, the control system comprising:
a high-level controller having an associated first memory, the first memory storing one or more readable instruction sets for high-level controller tasks;
a low-level controller having an associated second memory, the second memory storing one or more readable instruction sets for low-level controller tasks;
wherein the high-level controller tasks comprise:
receiving preview information related to a travel path for the hybrid vehicle, and one or more current state variables for the hybrid vehicle;
using a model of the low-level controller, one or more models of system dynamics for the hybrid vehicle, and the one or more current state variables,
calculating a fuel consumption over a prediction horizon including a portion of the travel path, and calculating one or more low-level control variables including an equivalence factor for use by the low-level controller, wherein the equivalence factor is a conversion coefficient between fuel energy and electric energy; and
communicating the one or more low-level control variables including the equivalence factor to the low-level controller;
wherein the low-level controller tasks comprise:
receiving the one or more low-level control variables including the equivalence factor from the high-level controller and one or more current state variables for the hybrid vehicle;
calculating, based on the equivalence factor, the first torque and the second torque to provide fuel consumption within minimum and maximum limits for each of the first torque and second torque; and
issuing control signals to the first and second power sources based on the first torque and the second torque to control a power split between the first and second power sources based on the calculated fuel consumption and thereby minimize fuel consumption of the hybrid vehicle.

2. The control system of claim 1, wherein:
the high-level controller is configured to calculate one or more control values at a first sampling rate;
the low-level controller is configured to calculate the first torque, second torque, and on/off signal at a second sampling rate; and
the second sampling rate is a faster sampling rate than the first sampling rate.

3. The control system of claim 1, wherein the second power source uses a fuel, and the low-level controller tasks include instructions for determining on/off commands for the second power source.

4. The control system of claim 1, wherein the hybrid vehicle further includes a transmission configured to receive the first and second torques and use one of at least two selectable gear ratios to deliver power to one or more drive wheels of the hybrid vehicle; wherein:
the low-level controller tasks comprise instructions for calculating a gear ratio request for delivery to the transmission; and
the model of the low-level controller used by the high-level controller includes a model of the low-level controller calculating a gear ratio request.

5. The control system of claim 4, wherein the instructions for calculating a gear ratio request include:
identifying feasible gear ratios;
calculating wheel torque request to transmission torque request ratios;
finding a torque split for each feasible gear ratio;
calculating a cost for the torque split for each feasible gear ratio; and
selecting a gear ratio from the feasible gear ratios having the least cost.

6. The control system of claim 5, wherein the instructions for calculating a gear ratio request are configured to calculate the cost for the torque split of each feasible gear ratio as a sum of a fuel power cost, electric power cost, and a change cost.

7. The control system of claim 1, wherein the high-level controller tasks include:

using the preview information to estimate the hybrid vehicle speed in a prediction window;
combining the hybrid vehicle speed and preview information to estimate combined torque needed in the prediction window;
calculating the fuel consumption that meets the estimated combined torque needed in the prediction window to yield a fuel equivalence factor for the prediction window; and
communicating the fuel equivalence factor for the prediction window to the low-level controller.

8. The control system of claim 7, wherein the low-level controller tasks include calculating a torque split between first and second power sources using the current state and the fuel equivalence factor.

9. The control system of claim 1, wherein the high-level controller tasks rely on a driver model to calculate the one or more low-level control variables, and the low-level controller tasks rely on driver control actions to calculate the first torque and the second torque.

10. The control system of claim 1, wherein the high-level controller tasks use inputs from a navigation system to determine preview information, but not driver control actions, and the low-level controller tasks do not use inputs from the navigation system.

11. A method of controlling a hybrid vehicle powertrain, the hybrid vehicle powertrain having a first power source that is a battery having a state of charge and a motor configured to provide a first torque, and a second power source configured to provide a second torque, the hybrid vehicle powertrain being controlled with each of:
a high-level controller having an associated first memory, the first memory storing one or more readable instruction sets for high-level controller tasks;
a low-level controller having an associated second memory, the second memory storing one or more readable instruction sets for low-level controller tasks
wherein the method comprises the high-level controller:
receiving preview information related to a travel path for the hybrid vehicle, and one or more current state variables for the hybrid vehicle;
using a model of the low-level controller, one or more models of system dynamics for the hybrid vehicle, and the one or more current state variables, calculating a fuel consumption over a prediction horizon including a portion of the travel path, and calculating one or more low-level control variables include an equivalence factor for use by the low-level controller, wherein the equivalence factor is a conversion coefficient between fuel energy and electric energy; and
communicating the one or more low-level control variables including the equivalence factor to the low-level controller;
and the method further comprises the low-level controller:
receiving the one or more low-level control variables including the equivalence factor from the high-level controller and one or more current state variables for the hybrid vehicle;
calculating, based on the equivalence factor, the first torque and the second torque to provide fuel consumption within minimum and maximum limits for each of the first torque and second torque; and
issuing control signals to the first and second power sources based on the
first torque and the second torque to control a power split between the first and second power sources based on the calculated fuel consumption and thereby minimize fuel consumption of the hybrid vehicle.

12. The method of claim 11, wherein:
the high-level controller calculates one or more control values at a first sampling rate;
the low-level controller calculates the first torque, second torque, and on/off signal at a second sampling rate; and
the second sampling rate is a faster sampling rate than the first sampling rate.

13. The method of claim 11, wherein the second power source uses a fuel, and the method includes the low-level controller determining and issuing on/off commands for the second power source.

14. The method of claim 11, wherein the hybrid vehicle includes a transmission configured to receive the first and second torques and use one of at least two selectable gear ratios to deliver power to one or more drive wheels of the hybrid vehicle; wherein the method further includes:
the low-level controller calculating a gear ratio request for delivery to the transmission and issuing the gear ratio request to the transmission; and
the model of the low-level controller used by the high-level controller includes a model of the low-level controller calculating a gear ratio request.

15. The method of claim 11, wherein the low-level controller calculates the gear ratio request by:
identifying feasible gear ratios;
calculating wheel torque request to transmission torque request ratios;
finding a torque split for each feasible gear ratio;
calculating a cost for the torque split for each feasible gear ratio; and
selecting a gear ratio from the feasible gear ratios having the least cost.

16. The method of claim 15, wherein the low-level controller calculates the cost for the torque split of each feasible gear ratio as a sum of a fuel power cost, electric power cost, and a change cost.

17. The method of claim 11, further comprising the high-level controller:
using the preview information to estimate the hybrid vehicle speed in a prediction window;
combining the hybrid vehicle speed and preview information to estimate combined torque needed in the prediction window;
calculating the fuel consumption that meets the estimated combined torque needed in the prediction window to yield a fuel equivalence factor for the prediction window; and
communicating the fuel equivalence factor for the prediction window to the low-level controller.

18. The method of claim 17, further comprising the low-level controller calculating a torque split between first and second power sources using the current state and the equivalence factor.

19. The method of claim 11, further comprising the high-level controller using a driver model to calculate the one or more low-level control variables, and the low-level using actual driver control actions to calculate the first torque and the second torque.

20. The method of claim 11, further comprising the high-level controller using inputs from a navigation system to determine preview information, but not driver control actions.

* * * * *